US009165432B2

(12) United States Patent
MacDonald et al.

(10) Patent No.: US 9,165,432 B2
(45) Date of Patent: Oct. 20, 2015

(54) FAST ACTION BACCARAT

(71) Applicant: Las Vegas Sands Corp., Las Vegas, NV (US)

(72) Inventors: Andrew MacDonald, Singapore (SG); Wayne Stevens, Invercargill (NZ)

(73) Assignee: Las Vegas Sands Corp., Las Vegas, NV (US)

( * ) Notice: Subject to any disclaimer, the term of this patent is extended or adjusted under 35 U.S.C. 154(b) by 44 days.

(21) Appl. No.: 13/866,351

(22) Filed: Apr. 19, 2013

(65) Prior Publication Data

US 2013/0281175 A1 Oct. 24, 2013

Related U.S. Application Data

(60) Provisional application No. 61/637,439, filed on Apr. 24, 2012.

(51) Int. Cl.
*A63F 9/24* (2006.01)
*A63F 13/00* (2014.01)
*G06F 17/00* (2006.01)
*G06F 19/00* (2011.01)
*G07F 17/32* (2006.01)

(52) U.S. Cl.
CPC .......... *G07F 17/3293* (2013.01); *G07F 17/322* (2013.01)

(58) Field of Classification Search
CPC ..................................................... G07F 17/322
See application file for complete search history.

(56) References Cited

U.S. PATENT DOCUMENTS

| | | | | |
|---|---|---|---|---|
| 2,430,682 A | | 11/1947 | Merkle | |
| 4,157,139 A | * | 6/1979 | Bjork | 209/552 |
| 5,715,927 A | * | 2/1998 | Brandt | 194/344 |
| 5,735,742 A | | 4/1998 | French | |
| 5,770,533 A | * | 6/1998 | Franchi | 463/42 |
| 5,788,574 A | * | 8/1998 | Ornstein et al. | 463/25 |
| 5,941,769 A | | 8/1999 | Order | |
| 8,366,112 B1 | * | 2/2013 | Nasibyan | 273/309 |
| 2002/0044411 A1 | * | 4/2002 | Iredale | 361/683 |
| 2004/0229682 A1 | * | 11/2004 | Gelinotte | 463/25 |
| 2007/0129129 A1 | | 6/2007 | Tinghitella | |
| 2010/0304841 A1 | * | 12/2010 | Sammon et al. | 463/25 |

FOREIGN PATENT DOCUMENTS

WO WO-88/01082 A1 2/1988

* cited by examiner

*Primary Examiner* — Kevin Y Kim
(74) *Attorney, Agent, or Firm* — McDermott Will & Emery LLP

(57) ABSTRACT

A gaming station that includes a plurality of player gaming units is provided. Each player gaming unit may include a betting area on a surface of a trapdoor. Such a trapdoor may support one or more chips in the betting area when the trapdoor is closed. When the trapdoor opens, the chips fall into an internal chip collection area. The player gaming unit may further include an adjustable screen. When the screen is in the closed position, the screen serves to block a player at the player gaming unit from accessing the betting area. When the screen is in the open position, the player is allowed to access the betting area. The gaming station may further include a sliding float for holding a plurality of chips. Such a sliding float may be movable past the plurality of player stations.

16 Claims, 2 Drawing Sheets

FAST ACTION BACCARAT

CROSS-REFERENCE TO RELATED APPLICATIONS

The present invention claims the priority benefit of U.S. provisional patent application No. 61/637,439 filed on Apr. 24, 2012, the disclosure of which is incorporated herein by reference.

BACKGROUND

1. Field of the Invention

The present invention generally relates to gaming tables.

2. Description of the Related Art

Currently, many games involving gambling are played in casinos. Such games may include cards, dice, buttons, and balls. Many of these games are also available for play in a fully virtual environment (e.g., gambling machines). The translation of games involving physical cards, dice, buttons, balls, chips, etc. into a virtual environment has advantages and disadvantages. Virtual game play may allow for game play scenarios that are difficult, if not impossible, at a physical table. For example, electronic games allow for large numbers of game players located at remote distances to be able to play together. While efficiency and speed of the game may also improve based on faster (computer-executed) dealing, bet calculations, etc., some players may miss the enjoyment of competing face-to-face and handling physical cards and chips.

Baccarat, for example, is a type of card game that allows for gambling. Generally, in Baccarat, cards 2-9 are worth face value; 10, J, Q, and K are worth zero; and Aces are worth 1 point. Hands are valued according to the rightmost digit of the sum of their constituent cards: for example, a hand consisting of 2 and 3 is worth 5, but a hand consisting of 6 and 7 is worth 3 (the rightmost digit of the total, 13). As such, the highest possible hand value is 9. Electronic gaming stations for baccarat have not, however, been as popular as other types of electronic gaming stations.

There is, therefore, a need for improved systems and methods of optimizing the electronic gambling experience.

SUMMARY OF THE CLAIMED INVENTION

Embodiments of the present invention allow for a new type of gaming table to incorporate the efficiencies of technology while preserving some of the tactile and sensory experiences of traditional gaming. Such a gaming table may also allows more players to play baccarat at a single table than traditionally available, thereby maximizing areas with space constraints and allowing more players to play given a limitation on the number of licensed tables per establishment. In addition, such a gaming table may also reduce the staff-to-player ratio required to manage game sessions.

Such gaming station may include a plurality of player gaming units. Each player gaming unit may include a betting area on a surface of a trapdoor. Such a trapdoor may support one or more chips in the betting area when the trapdoor is closed. When the trapdoor opens, the chips fall into an internal chip collection area. The player gaming unit may further include an adjustable screen. When the screen is in the closed position, the screen serves to block a player at the player gaming unit from accessing the betting area. When the screen is in the open position, the player is allowed to access the betting area. The gaming station may further include a sliding float for holding a plurality of chips. Such a sliding float may be movable past the plurality of player stations.

DETAILED DESCRIPTION

Embodiments of the present invention allow for a new type of gaming table to incorporate the efficiencies of technology while preserving some of the tactile and sensory experiences of traditional gaming. Such a gaming table may also allows more players to play baccarat at a single table than traditionally available, thereby maximizing areas with space constraints and allowing more players to play given a limitation on the number of licensed tables per establishment. In addition, such a gaming table may also reduce the staff-to-player ratio required to manage game sessions.

Figure 1:
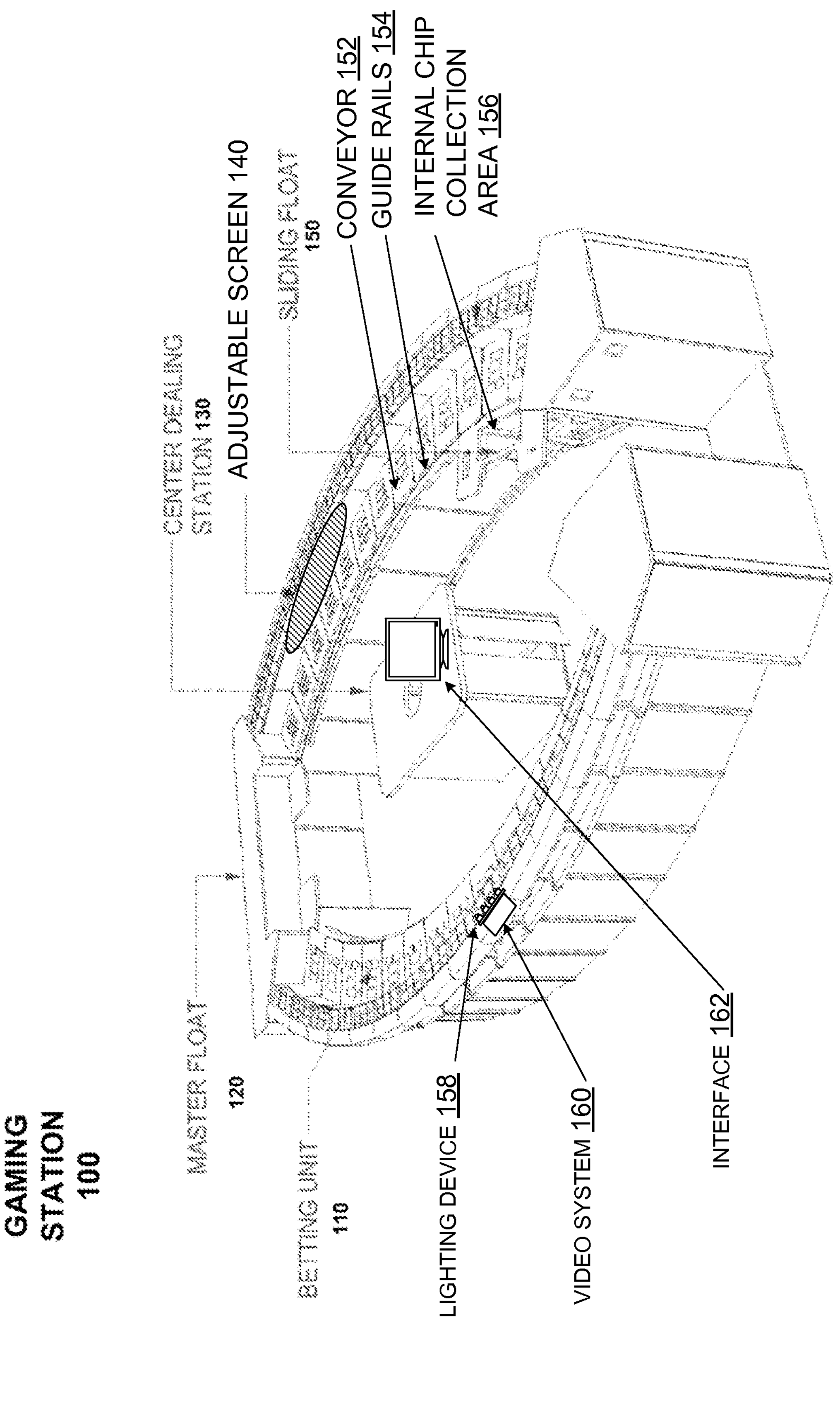
FIG. 1 is an illustration of an exemplary gaming station in accordance with the claimed invention.

FIG. 1 is an illustration of an exemplary gaming station 100 in accordance with the claimed invention. An exemplary gaming station may provide multiple player gaming units (or betting units or betting zones) 110 positioned adjacent to each other. An individual game player may be allowed to play in a player gaming unit 110, which includes a betting area for placing chip bets in the course of a game. Discussed in further detail below with respect to FIG. 2, each player gaming unit 110 may include a betting area for accepting bets on multiple betting options where each betting option is associated with a trapdoor. Gaming station 100 may further include a master float 120, a center dealing station 130, one or more screens 140 (e.g., associated with each player gaming unit 110), and one or more sliding floats 150.

A master chip float 120 may hold a collection of betting chips managed by an entity hosting the game (e.g., the "house"). Such a master float 120 may be similar to and may incorporate chip trays known in the art. Because the gaming station 100 is meant to be played by many (e.g., more than can be seated at traditional gaming tables known in the art) players, however, the master float 120 may hold a much larger number of chips so as to be able to accommodate the greater number of players.

To distribute chips to winners, a dealer may use sliding float 150, which may hold a smaller number of chips than the master float 120 and as such, may be restocked as needed from the master float 120. Such a sliding float 150 may include chip trays known in the art. The sliding float 150 may further be associated with guide rails 154 corresponding to a path along a side of the gaming station 100. Such guide rails 154 allow the sliding float 150 to slide along the gaming station 100 past the plurality of player gaming units 110.

The sliding float 150 may further have an indentation, gap, or other mechanism for accommodating a body of a dealer. In an exemplary embodiment, the dealer may stand within the indentation of the sliding float 150 at one end of the gaming station 100. When the game result is known, the dealer may begin to pay out winning bets starting with the player gaming unit 110 at that end. To pay out the next winning player at another player gaming unit 110, the dealer may move along the path corresponding to the side of the gaming station 100. As the dealer may be standing in the indentation of the sliding float 150, the movement of the dealer causes the sliding float 150 to move along the path. While an indentation may be one way to cause the sliding float 150 to move in accordance with the movement of a dealer, other mechanisms may be possible, including those that allow for pushing or pulling of the sliding float 150, belts or other attachments, automated sensors and conveyors (e.g., conveyor 152), and any other mechanism known in the art that would allow a dealer to easily move a chip tray of the sliding float 150 from one end of the gaming station 100 to another.

A center dealing station 130 provides a surface whereupon part or all of a game may be played. In baccarat, for example, a dealer would deal and reveal cards upon the surface of the center dealing station 130. As the dealer is located at the center dealing station 130 during the course of gameplay, the center dealing station 130 may include an interface 162 for receiving information regarding the result of a game so as to trigger certain actions. Such an interface 162 may include a control panel, buttons, levers, touchscreen, and any control interface known in the art for receiving information. For example, a dealer may indicates (via the interface 162) when a betting period is open for a particular game. In response, a betting area may close all of its trapdoors and a screen 140 (described in further detail with respect to FIG. 2) at each player gaming unit 110 may be adjusted to allow players access to their respective betting areas. Likewise, when the dealer indicates that a betting period is closed, the screen 140 may be adjusted to block players' access to their respective betting areas (e.g., to prevent "past post betting").

The interface 162 at the center dealing station 130 may further receive indications regarding a result of the game. Such a game result means that some betting options will be revealed as winning bets, and some betting options will be revealed as losing bets. The trapdoors associated with losing bets may be triggered to open, thereby allowing the bet chips placed thereon to fall into an internal chip collection area 156. The internal chip collection area 156 may include one or more conveyors that carry the fallen chips to a chip machine (e.g., at or proximate to the master float 120) to be sorted.

Figure 2:
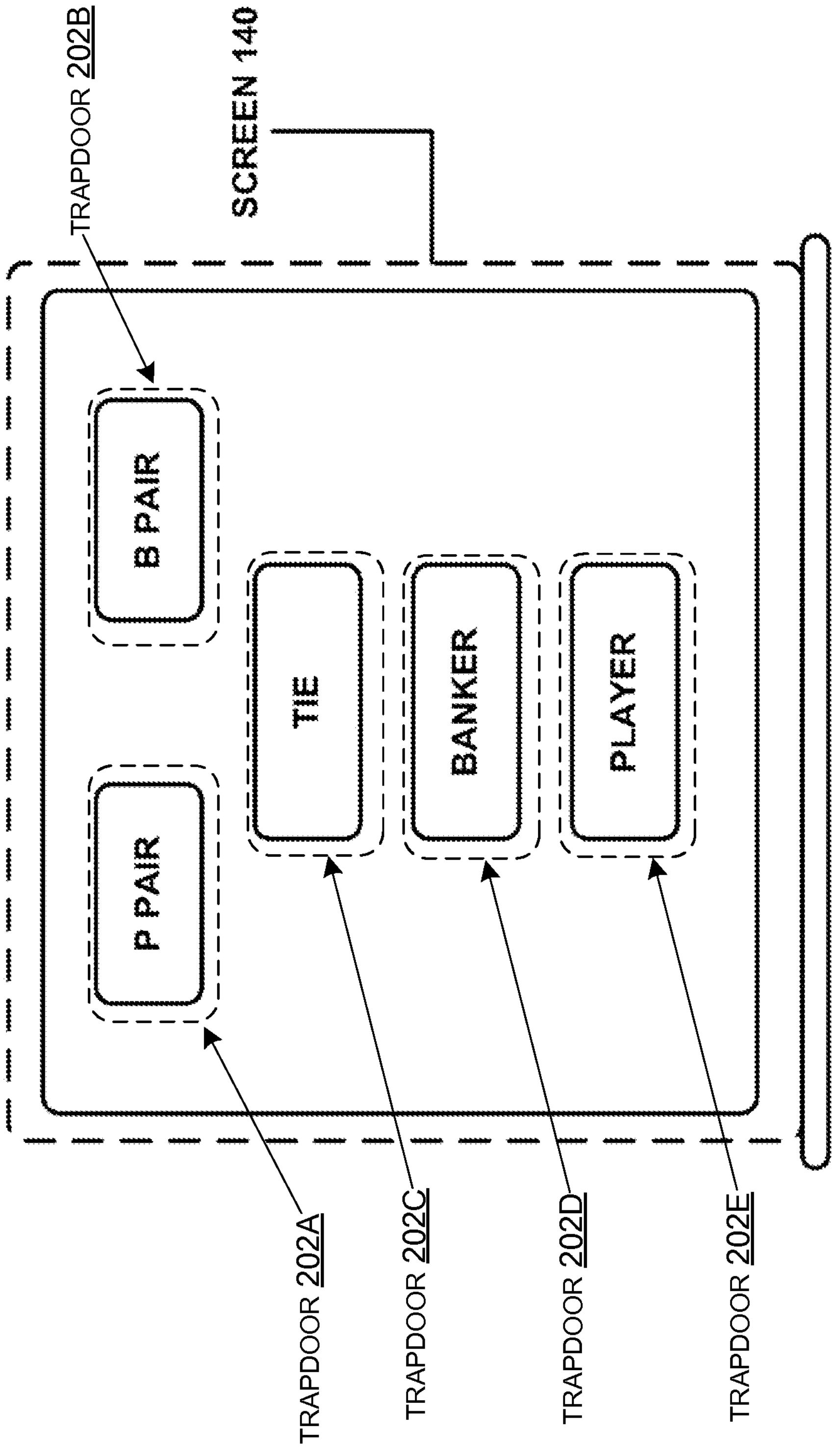
FIG. 2 is an illustration of an exemplary betting area of a player gaming unit in accordance with the claimed invention.

FIG. 2 is an illustration of an exemplary betting area of a player gaming unit 110 in accordance with the claimed invention. While the illustrated betting area corresponds to baccarat betting options, other embodiments for the betting area are possible, including variations on baccarat, as well as other casino games and variations thereof. The betting area of the player gaming unit 110 may include a plurality of trapdoors 202*a*-202*e*, each of which may have a surface that visually represents a particular betting option. For example, the trapdoors of FIG. 2 correspond to betting options for "P PAIR," "B PAIR," "TIE," "BANKER," AND "PLAYER." A player at the player gaming unit 110 may, when allowed, place a bet of one or more chips on any of the trapdoors corresponding to the betting options. A game result is generally associated with a subset of betting options representing wins and a subset of betting options representing losses. A trapdoor that represents a losing option will be triggered to open to allow the chips bet thereon to fall into an internal chip collection area (not pictured). For example, if a player placed a bet on the trapdoor marked "TIE" and the game results did not indicate a tie, the "TIE" trapdoor would be triggered to open. When the trapdoor opens, the chips bet thereon falls into an internal collection area and conveyed (e.g., by conveyor belt) to a chip machine for sorting. Once the chips have fallen into the internal collection area, the trapdoor may automatically close or may be triggered to close by an indication from the dealer that another betting period (e.g., for a next game) is opening.

The player gaming units 110 may further be associated with an adjustable screen 140, which may determine when a player at the player gaming unit 110 is allowed to place bets. There may be a screen 140 for each single player gaming unit 110, or there may be a screen 140 large enough to be used for several player gaming units 110. The screen 140 may be adjusted to an open position and a closed position. When the screen 140 is in an open position, the screen 140 does not block a player at the player gaming unit 110 from accessing the betting area so as to place bets. While in the closed position, the screen 140 acts as a barrier to block the player from accessing the betting area. The adjustment may include swinging, sliding, or other adjustments known in the art for moving a screen. In particular, the screen 140 may be adjusted to the open position when a betting period has opened and adjusted to a closed position when the betting period has closed. In some embodiments, the screen 140 may be made of a transparent material to allow the player to view the betting area when the screen 140 is in the closed position.

In an exemplary use of the gaming station 100, multiple players may be seated at the player gaming units 110, one player per player gaming unit 110. A dealer at center dealing station 130 may indicate via an interface that a betting period is open, which may trigger a screen 140 at the player gaming unit 110 to be adjusted to an open position. As such, the player is allowed to access the betting area for betting. A player may place a bet of one or more chips on one or more of the trapdoors representing different betting options. The dealer at center dealing station 130 may then indicate when the betting period is closed, thereby triggering the screen 140 to be adjusted to a closed position. The dealer at center dealing station 130 may deal cards or otherwise perform game actions that provide a game result. Either the dealer or a mechanical equivalent (e.g., sensors, cameras) may register the game result and trigger the trapdoors associated with losing bets to open. The chips of the losing bets may then fall into the internal collection area and conveyed to a chip machine for sorting. In the meantime, one or more other dealers may pay out winning bets using the sliding float 150. As only winning bets are left in the betting areas across the player gaming units 110, the dealers need not collect any losing bets and may therefore just pay out all bets remaining in the betting areas. Starting with a player gaming unit 110 at one end of the gaming station 100, the payout dealer may pay out the winning bets using chips held by the sliding float 150 and work their way along the adjacent player gaming units 110 until all winning bets have been paid out.

Additional features of the gaming station 100 may include loyalty card readers, overhead signage, personal or communal jackpot features, winning position up-lighting, sound effects, video systems for displaying gameplay, game results, and game trends, and various computing systems for tracking and providing analysis (e.g., game trends) regarding one or more games, etc. While the present gaming table has been described by reference to the game of baccarat, other implementations may be possible including variations of baccarat and other gambling games known in the art.

Additional features of the gaming station 100 may include loyalty card readers, overhead signage, personal or communal jackpot features, winning position up-lighting (e.g., lighting device 158), sound effects, video systems (e.g., video system 160) for displaying gameplay, game results, and game trends, and various computing systems for tracking and providing analysis (e.g., game trends) regarding one or more games, etc. While the present gaming table has been described by reference to the game of baccarat, other implementations may be possible including variations of baccarat and other gambling games known in the art.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. An apparatus for gaming, the apparatus comprising:
a gaming station comprising:
an internal chip collection area; and
a plurality of adjacent player gaming units, each player gaming unit comprising one or more trapdoors,
wherein for each of the one or more trapdoors:
the trapdoor has a surface which includes a betting area and which visually represents a respective betting option,
the trapdoor in a closed position supports one or more chips in the betting area, the one or more chips corresponding to a bet placed for the respective betting option, and
the trapdoor in an open position allows the one or more chips to fall into the internal chip collection area; and
a sliding float for holding a plurality of chips, wherein the sliding float is movable along the gaming station past the plurality of player gaming units.

2. The apparatus of claim 1, further comprising a dealing station.

3. The apparatus of claim 2, wherein the dealing station further comprises an interface for receiving information regarding a game.

4. The apparatus of claim 3, wherein the received information indicates a result of the game and wherein a current position of the trapdoor is adjusted based on the indicated game result.

5. The apparatus of claim 4, further comprising a processor executable to determine which of the one or more trapdoors to adjust to the open position based on the indicated game result.

6. The apparatus of claim 3, further comprising an adjustable screen, wherein the screen in the closed position blocks a player at the player gaming unit from accessing the betting area, and wherein the screen in the open position allows the player access to the betting area.

7. The apparatus of claim 6, wherein the received information indicates when a betting period has opened or ended and wherein the adjustable screen is adjusted based on the received information.

8. The apparatus of claim 1, further comprising one or more guide rails corresponding to a path along the gaming station, wherein the guide rails guide the sliding float along the path when the sliding float is moving.

9. The apparatus of claim 1, wherein the sliding float comprises an indentation configured to accommodate a body of a dealer and wherein movement of the dealer within the indentation along the path causes the sliding float to move along the path.

10. The apparatus of claim 1, further comprising a master float for holding a plurality of chips for restocking the sliding float.

11. The apparatus of claim 1, further comprising a conveyor for conveying one or more chips in the internal chip collection area to a chipping machine for sorting chips.

12. The apparatus of claim 1, wherein each player gaming unit further comprises a lighting device for activation when a player of one of the player gaming units wins a game.

13. The apparatus of claim 1, further comprising a video system for displaying a game result.

14. The apparatus of claim 13, further comprising memory for tracking a plurality of game results and wherein the video system displays a set of tracked game results.

15. The apparatus of claim 1, further comprising a past post screen coupled to the gaming station, wherein the past post screen is configured to physically block players at the plurality of adjacent player gaming units from accessing the respective betting areas.

16. An apparatus for gaming, the apparatus comprising:
a gaming station comprising:
an internal chip collection area and
a plurality of adjacent player gaming units, each player gaming unit comprising one or more trapdoors,
wherein for each of the one or more trapdoors:
the trapdoor has a surface which includes a betting area and which visually represents a respective betting option,
the trapdoor in a closed position supports one or more chips in the betting area, the one or more chips corresponding to a bet placed for the respective betting option, and
the trapdoor in an open position allows the one or more chips to fall into the internal chip collection area and
a movable float and glide rails coupled to the gaming station, wherein the movable float and glide rails are configured to provide for a dealer to deal to a plurality of players respectively corresponding to the plurality of adjacent player gaming units.

* * * * *